US008820269B2

(12) United States Patent
Duwig et al.

(10) Patent No.: US 8,820,269 B2
(45) Date of Patent: Sep. 2, 2014

(54) METHOD AND SYSTEM FOR OPERATING A COMPRESSION IGNITION ENGINE ON ALCOHOL CONTAINING PRIMARY FUELS

(75) Inventors: Christophe Duwig, Malmö (SE); Pär L. Gabrielsson, Helsingborg (SE); Svend-Erik Mikkelsen, Værløse (DK); Ton V. W. Janssens, Bagsværd (DK)

(73) Assignee: Haldor Topsoe A/S, Lyngby (DK)

( * ) Notice: Subject to any disclaimer, the term of this patent is extended or adjusted under 35 U.S.C. 154(b) by 0 days.

(21) Appl. No.: 13/634,386

(22) PCT Filed: Mar. 2, 2011

(86) PCT No.: PCT/EP2011/001024
§ 371 (c)(1),
(2), (4) Date: Sep. 12, 2012

(87) PCT Pub. No.: WO2011/120618
PCT Pub. Date: Oct. 6, 2011

(65) Prior Publication Data
US 2013/0000571 A1 Jan. 3, 2013

(30) Foreign Application Priority Data

| Mar. 31, 2010 | (DK) | 2010 00273 |
| Jul. 2, 2010 | (DK) | 2010 00587 |
| Jul. 5, 2010 | (DK) | 2010 00590 |
| Sep. 9, 2010 | (DK) | 2010 00801 |
| Nov. 15, 2010 | (DK) | 2010 01036 |

(51) Int. Cl.
*F02B 63/00* (2006.01)
(52) U.S. Cl.
USPC .................. 123/2; 123/1 A; 123/3

(58) Field of Classification Search
USPC .................................. 123/1 A, 1 R, 3
See application file for complete search history.

(56) References Cited

U.S. PATENT DOCUMENTS

| 2,011,000 A * | 8/1935 | Kingsbury ............... 408/11 |
| 4,422,412 A * | 12/1983 | Norton ................. 123/3 |
| 5,097,803 A * | 3/1992 | Galvin ................. 123/3 |
| 6,340,003 B1 * | 1/2002 | Schoubye et al. ........ 123/3 |
| 7,220,392 B2 * | 5/2007 | Rong et al. ............ 422/201 |
| 7,614,385 B2 * | 11/2009 | Bysveen et al. ........ 123/456 |
| 7,770,545 B2 * | 8/2010 | Morgenstern ........... 123/3 |
| 2004/0123523 A1 * | 7/2004 | Rong et al. ............ 48/200 |
| 2008/0098985 A1 | 5/2008 | Kamio |
| 2008/0169449 A1 * | 7/2008 | Mundschau ............ 252/373 |
| 2008/0213638 A1 * | 9/2008 | Brantley et al. ........ 429/19 |
| 2008/0282998 A1 | 11/2008 | Kuzuoka et al. |
| 2010/0175311 A1 * | 7/2010 | Allen et al. ............ 44/403 |
| 2011/0005501 A1 * | 1/2011 | Eberhard ............. 123/550 |

FOREIGN PATENT DOCUMENTS

JP 2006-167511 A 6/2006

* cited by examiner

*Primary Examiner* — Noah Kamen
*Assistant Examiner* — Long T Tran
(74) *Attorney, Agent, or Firm* — Dickstein Shapiro LLP

(57) ABSTRACT

Method of operating a compression ignition engine on ether containing fuel obtained by on board conversion of an alcohol containing primary fuel, and a system for use in the method. The alcohol containing primary fuel is heated within a dehydration reactor by indirect heat exchange with ether containing fuel prepared in the dehydration reactor by dehydrating the alcohol containing primary fuel. The ether containing fuel is cooled prior to withdrawal from the reactor as a result of the indirect heat exchange with the alcohol containing primary fuel.

14 Claims, 1 Drawing Sheet

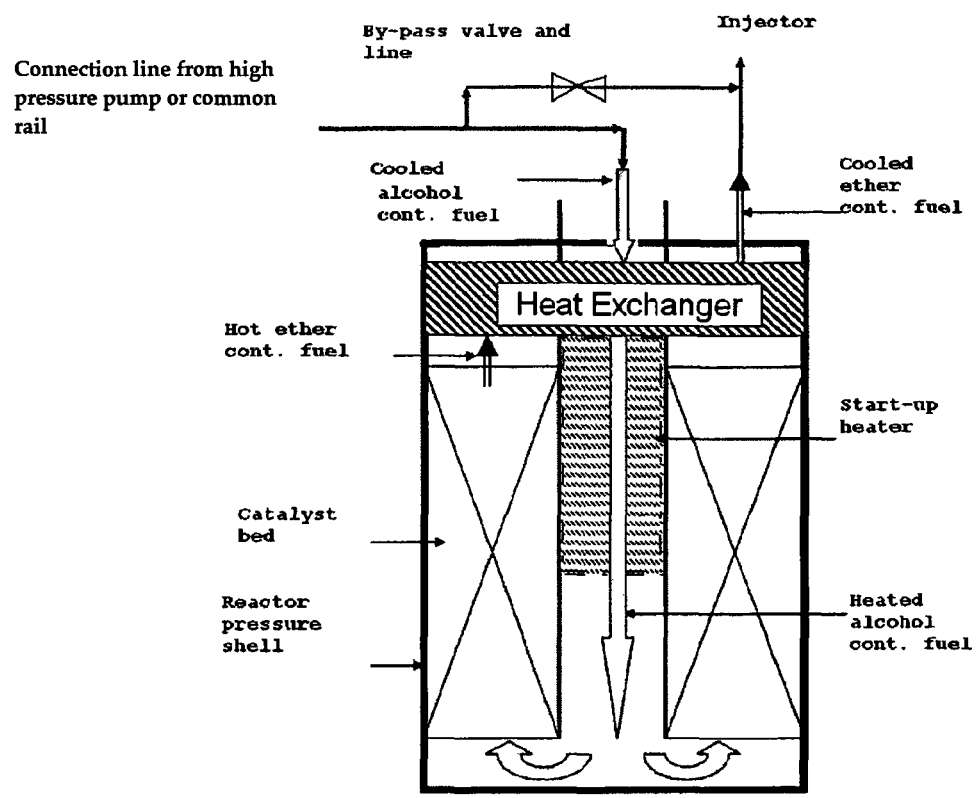

METHOD AND SYSTEM FOR OPERATING A COMPRESSION IGNITION ENGINE ON ALCOHOL CONTAINING PRIMARY FUELS

The present invention is directed to a method of operating compression ignition engines and in particular to the operation of those engines with ether containing fuel being prepared on board.

The invention provides furthermore a system being useful for carrying out the method of the invention.

The most typical example of a compression ignition engine is the Diesel engine operating with high cetane numbered Diesel fuel. To reduce environmental pollution arising from combustion of Diesel fuel, several attempts have been made in the past to replace Diesel fuel with alternative fuels having reduced impact on the environment.

Ethers, in particular ethers prepared by dehydration of lower alcohols, such as dimethyl and diethyl ether, have shown to be a superior Diesel fuel in term of impact on the environment.

Use of lower ethers as Diesel fuel has been described in number of publications, e.g. U.S. Pat. Nos. 4,892,561; 5,906,664 and 7,449,034.

Despite of its clean combustion characteristics and high efficiency in a Diesel engine, the main disadvantage of ether based fuels is difficult storage and handling on board of vehicles. At ambient conditions, dimethyl ether is in the gaseous form. To transform the dimethyl ether fuel to its more convenient liquid form, the fuel has to be stored and handled under pressure.

It is known from the literature that ethanol is a poor fuel when applied to compression ignition engines. However, it was reported that ethanol/diethyl ether (DEE) mixtures overcome this limitation and open avenues for efficient and very clean diesel engine operation. However, there are practical issues to be handled. DEE is not at present available in any distribution network and has relatively stringent safety limitations including the use of a pressurized fuel tank. Together it advocates for the use of ethanol or ethanol containing fuels with conversion onboard of a vehicle.

The production of DEE can be performed by dehydration of ethanol over a suitable catalyst. Including such a system on-board implies evaporating the ethanol containing fuel, performing the conversion, condensating the products and further compression of the mixture (up to 600-2400 bar) before injection into the engine. Additionally, the feed stock must be preheated prior to starting the conversion. The preheating is carried out by heat exchange with the hot exhaust gas or by electric heater. Hence, some extra heating systems are necessary to allow catalytic conversion at around 200° C. with negative effect on the system efficiency.

The unsteady operation also adds in complexity for the necessary equipment and leads to additional costs in manufacturing and extra weight for the vehicle.

We have found that known methods and systems for the conversion of primary alcohol fuel to ether containing engine fuel can be improved, when performing the alcohol conversion to ether in, autothermal manner, preferably in liquid phase.

Thus, a general embodiment of the invention is a method of operating a compression ignition engine on ether containing fuel obtained by on board conversion of an alcohol containing primary fuel, comprising the steps of:

(a) withdrawing the alcohol containing primary fuel from a fuel tank and pressurising the primary fuel to a final engine injection pressure;

(b) introducing the pressurized primary fuel into a catalytic dehydration reactor;

(c) in the reactor catalytically dehydrating the pressurized primary fuel to ether containing fuel by contact with a with an alcohol dehydration catalyst; and (d) withdrawing the ether containing fuel from the reactor and injecting the ether containing fuel into the engine, wherein the pressurized primary fuel is heated within the reactor to reaction temperature prior to the catalytic dehydration by indirect heat exchange with the ether containing fuel and thereby cooling the ether containing fuel prior to be withdrawn form the reactor.

Further embodiments of the method according to the invention are described in claims 2 to 9 and in the following description.

The invention provides furthermore a system for use in operating a compression ignition engine on ether containing fuel, comprising a compression ignition engine;
a fuel tank adapted to store a primary alcohol containing fuel;
a high pressure pump to pressurize the primary fuel;
at least one dehydration reactor adapted to receive the pressurized primary fuel and comprising within a common pressure shell a heat exchanger adapted to indirectly heat the pressurized primary fuel and to cool ether containing fuel and a downstream catalyst bed with an alcohol dehydration catalyst for conversion of the heated pressurized primary fuel to the ether containing fuel; and
at least one connection pipe connecting outlet of the dehydration reactor with fuel one or more injectors for injection of the ether containing fuel into the engine.

Further embodiments of the system according to the invention are described in claims 10 to 16 and in the following description.

The operating conditions of the inventive method will typically be adjusted to a catalyst inlet temperature of between 150° C. and 350° C. and an injection pressure of between 80 and 2400 bars. Thereby, conversion of alcohol to a mixture of ether, water and alcohol proceeds in adiabatic manner in the liquid phase at appropriate reaction rate in presence of the dehydration catalyst.

In accordance to the invention, the required heat is recovered from the exothermal dehydration reaction of the primary alcohol containing fuel to the ether containing fuel. The primary alcohol containing fuel is pressurized in the high pressure pump to injection pressure in order to maintain the fuel in the liquid phase at the inlet temperature into the dehydration catalyst and to provide the required engine injection pressure of the formed ether containing fuel.

A standard heat exchanger (i.e. reasonably light device) can not withstand the high pressure in the fuel loop. However, integrating the heat exchanger inside the catalytic dehydration reactor, this limitation is overcome. The differential pressure between the primary fuel and the effluent from the catalyst, i.e. the ether containing fuel, is at most a few bar which lies in the standard range for e.g. light, compact and efficient plate heat exchanger, which is a preferred heat exchanger for use in the invention.

An advantage of the method and system according to the invention is that all of the formed ether fuel is instantly used for combustion in the engine and storage of surplus ether containing fuel is avoided.

A further advantage of the method and system according to the invention is that the conversion of the primary fuel to the ether containing fuel can be performed in liquid phase and there is no need of evaporation of primary fuel and condensation of the ether containing fuel product in that case. The heat recuperation enables auto-thermal operation. No additional need exists to preheat the primary fuel, except at start-up.

During start up of the engine, the heat contained in dehydrated alcohol containing primary fuel may be at a temperature, which is insufficient to supply the necessary temperature to preheat the alcohol containing primary fuel.

At those conditions, it is preferred to include a further step in the above operation method of additionally heating the pressurized fuel e.g. by means of an electrical heater mounted within the reactor or an engine heater upstream the reactor inlet.

Thus in an embodiment of the invention, the pressurized liquid primary fuel is periodically preheated by passage through a start up-heater prior to introduction into the dehydration catalyst.

Formation of the ether containing fuel is accomplished by catalytic dehydration of the alcohol to its corresponding ether according to the reaction:

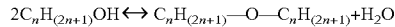

$$2C_nH_{(2n+1)}OH \leftrightarrow C_nH_{(2n+1)}-O-C_nH_{(2n+1)}+H_2O$$

Suitable dehydration catalysts for use in the invention comprise all solid acids, such as alumina, silica alumina, a zeolite, tungstated oxides, sulfated oxides, alumina phosphates, materials containing sulfonic acid functional groups, such as sulfonated polystyrene, sulfonated fluorocarbon polymers, sulfonic acid functionalized oxide materials (alumina, SBA-15, silica) and mixtures thereof.

The alcohol dehydration catalyst is preferably arranged in fixed bed manner in the reactor, so that the pressurized primary fuel is passed from inlet of the reactor through the heat exchanger and subsequently through the catalyst bed.

In one embodiment of the invention, the fixed catalyst bed is arranged between outer wall of the reactor and a concentric space arranged centrally within the catalyst bed.

In further an embodiment the catalyst bed is arranged concentrically with the inner wall of the reactor and spaced apart the inner wall of the reactor.

Alcohol dehydration is an equilibrium reaction. Thus equilibrium limitations prevent 100% conversion of the alcohol to ether and water.

At a reaction temperature for e.g. a primary ethanol fuel consisting of 95 w % ethanol and 5 w % water, the equilibrium compositions in liquid phase at dehydration temperature between 150 and 350° C. are typically 9-21 w % ethanol, 19-22 w % $H_2O$ and 59-71 w % diethyl ether.

Ether fuels for use in compression ignition engines with useful ignition and combustion characteristics are for example a diethyl ether/ethanol/water mixture and a dimethyl ether/methanol/water mixtures with a methanol content of up to 20% and water content of up to 20%.

In U.S. Pat. No. 7,449,034 a Diesel fuel containing dimethyl ether, methanol and up to 48% water have been shown to be efficient fuels in compression ignition engines.

Beside of methanol and ethanol also mixtures of higher alcohols are suitable primary fuels for use in the invention.

Other suitable alcohol containing primary fuels are mixtures of hydrocarbons with one or more alcohols, such as biodiesel and alcohols, like Pongamia oil and ethanol (60-40 vol %), which will be catalytically converted to a mixture of bio-diesel/DEE/water containing ~15-20 vol % of DEE.

Further suitable primary fuels for use in the invention are mixtures of gasoline and alcohol, e.g. gasoline containing 85% ethanol being available at gas stations in Sweden.

In order to allow the system to be used when no alcohol containing fuel is available and the engine must be run on e.g. conventional diesel fuel, the reactor can be by-passed by means of a by-pass valve mounted in a by-pass pipe connecting the feed pipe from the high pressure pump or the common rail and the fuel injector pipe. In open position of the control valve primary fuel e.g. diesel can be passed directly to the engine through a by-pass pipe.

The above features and aspects of the invention are explained in more detail in the following description by reference to the drawings in which FIG. 1 schematically shows a cross section of a reactor for use in the method and system according to an embodiment of the invention.

The catalytic dehydration reactor system may consist of a single reactor common to all cylinders or of a collection of reactors one per cylinder depending on the free volume available on-board.

A common-rail (not shown) may be arranged between the high pressure pump and the catalytic dehydration reactor.

When operating the reactor cold alcohol containing primary fuel is passed from a high pressure pump (not shown) at a pressure of between 100 and 2000 bar, preferably 200-400 bar to the reactor. At these pressures, both the alcohol containing primary fuel and the formed ether containing fuel are liquid or super-critical. The alcohol containing primary fuel is introduced into the reactor and passes through a heat-exchanger arranged within the pressure shell of the reactor. The cold alcohol containing primary fuel is heated to the dehydration reaction temperature by indirect heat exchange with ether containing fuel from a subsequent catalyst bed in the heat exchanger in inlet portion of the reactor. For example, with operation at 50 bars, the alcohol containing fuel can enter the heat exchanger at 20° C. and be heated up to 220° C.

If the temperature of the alcohol containing primary fuel after the heat-exchanger is too low, an electric heater arranged downstream the heat exchanger within an axial space around axis of the reactor pre-heats the fluid to the adequate temperature. The preheated alcohol containing primary fuel passes through the axial space towards inlet of the catalyst bed. In the shown embodiment the catalyst bed is arranged between outer wall of the reactor and the axial space.

By passage through the catalyst bed comprising a dehydration catalyst, the alcohol in the primary fuel is partly dehydrated to ether and water. The conversion rate is controlled by the inlet temperature of alcohol containing primary fuel into the catalyst bed. The dehydration reaction is exothermic. Assuming that the primary fuel consists of 95% ethanol and 5% water entering the bed at 220° C., the dehydration product exits the catalyst around 240° C. at a conversion of 80% of the ethanol to diethyl ether and water.

The resulting effluent from the catalyst bed contains hot ether containing fuel that passes through the heat-exchanger in indirect heat exchange with the incoming alcohol containing primary fuel. The ether containing fuel is thereby cooled while pre-heating the cold alcohol containing primary fuel. The ether containing fuel is cooled from the above 240° C. to about 40° C. which corresponds to a preheating of 200° C. on the primary fuel side (from 20° C. to 220° C. as mentioned earlier).

The pressure difference between the fluid and effluent corresponds to the pressure drop over the catalytic bed and the preheater. Hence it is sufficiently low to allow using simple standard heat-exchanger.

During continuous operation, hot ether containing fuel leaves the catalyst bed due to the exothermic dehydration reaction. As exemplified above, the fuel is typically 10-20° C. (depending on the alcohol content of the primary fuel and the conversion over the bed) warmer than the alcohol containing primary fuel at reactor inlet. The temperature difference is sufficient to preheat adequately the alcohol containing primary fuel for dehydration. The hot ether containing is thereby cooled and passed to injectors of the engine (not shown).

A by-pass pipe between the high pressure pump or a common-rail provided with a valve allows fuel to be by-passed the dehydration reactor. In case the engine is operated with conventional diesel fuel instead of ether containing fuel, the by-pass valve is opened and fuel injection will proceed directly from the high pressure pump or common-rail allowing traditional engine operation.

In addition, the by-pass valve can be operated so that only a fraction of the alcohol containing primary fuel passes through the reactor. It gives the option of diluting the ether containing fuel with alcohol containing primary fuel, hence to tailor the composition of the final fuel to the engine regime.

The valve operation can for example ensure the injection in the engine cylinders of ether containing fuel at a first and switch to alcohol containing primary fuel injection once the combustion has started in the cylinders. This provides an additional degree of freedom for optimizing the engine operation.

The above description and the FIGURE are purely schematically and not at scale, parts and means being otherwise conventional in injection system that will be obvious to those skilled in the art are not shown in the FIGURE.

The invention claimed is:

1. Method of operating a compression ignition engine on ether containing fuel obtained by on board conversion of an alcohol containing primary fuel, comprising the steps of:
   (a) withdrawing the alcohol containing primary fuel from a fuel tank and pressurising the primary fuel to a final engine injection pressure;
   (b) introducing the pressurized primary fuel into a catalytic dehydration reactor;
   (c) in the reactor, catalytically dehydrating the pressurized primary fuel to ether containing fuel by contact with an alcohol dehydration catalyst; and
   (d) withdrawing the ether containing fuel from the reactor and injecting the ether containing fuel into the engine, wherein the pressurized primary fuel is heated within the reactor to reaction temperature prior to the catalytic dehydration by indirect heat exchange with the ether containing fuel and thereby cooling the ether containing fuel prior to be withdrawn from the reactor, wherein the indirect heat exchange is carried out in a plate heat-exchanger.

2. The method of claim 1, wherein the dehydration catalyst is arranged as fixed bed within the dehydration reactor.

3. The method according to claim 1, wherein the alcohol containing primary fuel contains a mixture of different alcohols.

4. The method according to claim 1, wherein the alcohol containing primary fuel comprises methanol and/or ethanol.

5. The method according to claim 1, wherein the alcohol containing primary fuel comprises a mixture of hydrocarbons and one or more alcohols.

6. The method according to claim 1, comprising the further step of by-passing part of the pressurized primary fuel the catalytic dehydration.

7. The method according to claim 1, wherein the pressurized alcohol containing fuel is in the liquid phase.

8. The method according to claim 1, comprising a further step of additionally heating the pressurized primary fuel subsequent to the heat indirect heat exchange and prior to the catalytic dehydration.

9. A system for use in operating a compression ignition engine on ether containing fuel, comprising
    a compression ignition engine;
    a fuel tank adapted to store a primary alcohol containing fuel;
    a high pressure pump to pressurize the primary fuel;
    at least one dehydration reactor adapted to receive the pressurized primary fuel and comprising within a common pressure shell a heat exchanger adapted to indirectly heat the pressurized primary fuel and to cool ether containing fuel and a downstream catalyst bed with an alcohol dehydration catalyst for conversion of the heated pressurized primary fuel to the ether containing fuel; and
    at least one connection pipe connecting outlet of the dehydration reactor with fuel one or more injectors for injection of the ether containing fuel into the engine, wherein the heat exchanger is a plate heat exchanger.

10. The system of claim 9, wherein the catalyst bed is arranged between outer wall of the reactor and a concentric space arranged centrally within the catalyst bed.

11. The system of claim 10, wherein the reactor further comprises a heater arranged downstream the heat exchanger.

12. The system according to claim 9, further comprising a common rail between the high pressure pump and inlet of the dehydration reactor.

13. The system according to claim 9, further comprising a valve-controlled by-pass pipe between the high pressure pump and the at least on connection pipe.

14. The system of claim 12, further comprising a valve-controlled by-pass pipe between the common rail and the at least one connection pipe.

* * * * *